Patented Oct. 28, 1924.

1,513,331

UNITED STATES PATENT OFFICE.

HERBERT W. LOW, OF OAKLAND, CALIFORNIA, ASSIGNOR OF ONE-HALF TO SENA C. WILLIAMS, OF OAKLAND, CALIFORNIA.

METHOD OF MAKING BUTTER FROM SOUR CREAM.

No Drawing.   Application filed February 15, 1922.   Serial No. 536,799.

*To all whom it may concern:*

Be it known that I, HERBERT W. LOW, a citizen of the United States, residing at Oakland, in the county of Alameda and State of California, have invented certain new and useful Improvements in Methods of Making Butter from Sour Cream, of which the following is a specification.

My invention is a method of making creamery butter from sour cream of high acidity so as to comply with the Federal and various State laws requiring pasteurization, but avoiding the method now in wide use and generally recognized as indispensable which requires the use of alkaline agents, such as lime and bicarbonate of soda for neutralizing the acidity of cream.

It is generally recognized that sour cream having acidity greater than 3% cannot be heated to temperatures required for pasteurizing without the coagulation of curd and this would cause not only serious defects in butter churned from such cream but great losses of butterfat.

The common method of making "pasteurized butter" from sour cream is to reduce the acidity to such a degree, by adding lime or bicarbonate of soda, as will not cause the coagulation of casein or curdling. This requires added expense for the cost of said neutralizers, extra skill and the resulting butter often is of poor flavor and keeping quality and tastes of neutralizing agents.

By my method I dispense entirely with neutralizing agents and produce a product of higher quality and above criticism as a pure food—free from contact with any chemical or foreign substances.

Cream of various lots as usually received by creamery plants, is taken as received without regard to its acidity and cooled in vats, or by any cooling apparatus, to the usual temperature for churning, varying from 45° F. to 60° F. according to special conditions. It is then churned as raw cream in the usual manner but not salted or worked, only the buttermilk being drawn off and the remaining fat washed and then removed from the churn. This fat is then placed in a vat and mixed with a certain proportion of sweet skim milk or whole milk such as 40% fat to 60% milk and the mixture heated to a temperature of 110° F. or more, at the same time being continually agitated to mix the fat evenly through the milk. This mixture is then put through a device for making an emulsion, which may consist of an ordinary steam ejector utilizing a jet of steam or be one of various mechanically operated devices on the market known as "emulsers" which use centrifugal force or special pumps and valves to produce an emulsion of fat and milk.

This emulsion mixture then becomes reconstituted sweet cream and is pasteurized either by the action of the jet of steam or in the use of mechanical emulsifiers by a separate pasteurizing step and then cooled. It is churned into butter in the usual manner.

By churning at low acidity, the buttermilk obtained from the emulsified cream can be used again for emulsifying a succeeding lot of fat churned from sour cream, thus not requiring a new supply of sweet milk for each lot churned.

Also another new advantage for this process is the utilizing of the buttermilk from the original sour cream for food purposes. Where this is made into powder form or made into condensed buttermilk for food purposes, whether for human use or for poultry or stock, it will be free of any foreign matter and can be sold as such, whereas by the method now in general use of employing chemical neutralizers, said neutralizing substances are nearly all retained in the butter milk and constitute adulterations which seriously interfere with the marketing and use of by-products made from such buttermilk.

By means of my method I am able to make pasteurized butter from sour cream, without the addition of foreign chemical substances to cream, and I am able to produce a purer and more hygienic butter and also a buttermilk free from foreign chemical substances.

By the term "milk," as used in the appended claims, I mean either whole milk, or its equivalents skimmed milk or butter milk of limited acidity, which will answer the same purpose so far as this process is concerned.

Having described my invention, I claim:

1. The method of making pasteurized butter from sour cream comprising extracting the fat from sour cream in raw condition without heating said cream, mixing said fat with milk, heating and agitating said mixture so as to thoroughly distribute the fat through the milk, then emulsifying said fat in said milk to form substantially a natural cream, pasteurizing said reconstituted cream and making said cream into butter substantially as described.

2. The method of making pasteurized butter from sour cream comprising extracting the fat from sour cream in raw condition without heating said cream by a churning process, mixing said fat with milk, heating and agitating said mixture so as to thoroughly distribute the fat through the milk, emulsifying said fat in said milk to form substantially a natural cream, pasteurizing said reconstituted cream and making the same into butter substantially as described.

3. The method of making pasteurized butter from sour cream comprising extracting the fat from said cream in raw condition at a reduced temperature, mixing said fat with milk, heating said mixture to a temperature of substantially 110° F. and agitating the same to mix the fat evenly through the milk, emulsifying said fat in said milk to form substantially a natural cream, pasteurizing said reconstituted cream and then making the same into butter substantially as described.

4. The method of making pasteurized butter from sour cream comprising extracting the fat from the sour cream in raw condition while said cream is at a temperature of substantially 45° F. to 60° F., mixing said fat with milk, heating said mixture to a temperature of substantially 110° F. and agitating said mixture so as to thoroughly distribute the fat through the milk, emulsifying the said fat in said milk to form a substantially natural cream, pasteurizing said reconstituted cream and making the same into butter substantially as described.

5. The method as disclosed which consists in taking cream which is usually received at creamery plants and cooling the same to the usual temperature for churning, churning said cream as raw cream in the usual manner without being salted or worked, drawing off the buttermilk, washing the fat and then removing the fat, mixing the fat with a certain proportion of sweet skimmed milk or whole milk and heating said mixture to a temperature of substantially 110° F. at the same time continually agitating the same to mix the fat evenly through the milk, converting the mixture into an emulsion of fat and milk which becomes reconstituted sweet cream, pasteurizing said emulsion or sweet cream in the usual way for butter making, and then cooling and churning the same in the usual manner.

6. The process of making butter from sour cream which consists in extracting the fat from said cream at a reduced temperature, mixing said fat with milk, heating and agitating said mixture so as to thoroughly distribute the fat through the milk, emulsifying said fat in said milk to substantially the form of natural cream, pasteurizing said reconstituted cream, churning said reconstituted cream to make pasteurized butter, drawing off the butter milk and repeating the process with the use of the butter milk thus obtained.

7. The process which comprises the repeated use of the butter milk obtained by churning reconstituted cream as the vehicle for fat extracted from sour cream without heating, in which butter milk, said fat is emulsified to form reconstituted cream.

In testimony whereof I affix my signature.

HERBERT W. LOW.